US008760667B2

(12) United States Patent
Jacobsen et al.

(10) Patent No.: US 8,760,667 B2

(45) Date of Patent: Jun. 24, 2014

(54) METHOD AND DEVICE FOR THE DETECTION OF A SUBSTRATE EDGE IN A PRINTING MACHINE

(75) Inventors: Thomas Jacobsen, Kiel (DE); Wolfgang Kuphaldt, Flintbeck (DE); Joerg Zessin, Ascheberg (DE)

(73) Assignee: Eastman Kodak Company, Rochester, NY (US)

( * ) Notice: Subject to any disclaimer, the term of this patent is extended or adjusted under 35 U.S.C. 154(b) by 273 days.

(21) Appl. No.: 13/320,808

(22) PCT Filed: Apr. 15, 2010

(86) PCT No.: PCT/EP2010/054936

§ 371 (c)(1),
(2), (4) Date: Feb. 29, 2012

(87) PCT Pub. No.: WO2010/133407

PCT Pub. Date: Nov. 25, 2010

(65) Prior Publication Data

US 2012/0147385 A1 Jun. 14, 2012

(30) Foreign Application Priority Data

May 22, 2009 (DE) ......................... 10 2009 022 316

(51) Int. Cl.
*G01B 11/14* (2006.01)
*G01N 21/88* (2006.01)

(52) U.S. Cl.
USPC .. 356/621; 356/430; 250/559.45; 250/559.36

(58) Field of Classification Search
USPC .................. 356/614–623, 429–431; 250/548, 250/559.01, 559.06, 559.11, 559.29, 250/559.36, 559.4
See application file for complete search history.

(56) References Cited

U.S. PATENT DOCUMENTS

| | | | | | |
|---|---|---|---|---|---|
| 3,782,834 | A | * | 1/1974 | Fujimori et al. | 356/398 |
| 3,845,319 | A | * | 10/1974 | Walter | 250/555 |
| 4,559,452 | A | * | 12/1985 | Igaki et al. | 250/559.36 |
| 5,146,087 | A | | 9/1992 | VanDusen | |
| 5,220,177 | A | * | 6/1993 | Harris | 250/548 |

(Continued)

OTHER PUBLICATIONS

Anonymous: Gradientoptik (Online), Apr. 29, 2009, XP002595236 Wikipedia, der freien Enzyklopadie Retrieved from the Internet: URL: http://de.wikipedia.org/w/index.php?title=Gradientenoptik &oldid=59545191>.

*Primary Examiner* — Hoa Pham

(57) ABSTRACT

The present invention relates to a method and a device for the detection of a substrate edge in a printing machine comprising a substrate transport unit that defines a substrate transport path (8). In this method, at least one light value of a first section of a sensor line (10) and a dark value of a second section of the sensor line are determined, and a threshold value is calculated based thereon. When the threshold value on one pixel is exceeded and the threshold value on another pixel is not reached, it is possible to calculate a position of the substrate edge. The device comprises a light source arrangement (5) for generating diffuse light, and comprises a sensor line for the detection of light from the light source arrangement. Furthermore, a gradient lens arrangement (15) is provided, said gradient lens arrangement being arranged between the light source and the sensor line in such a manner that, on the one hand, a focus is located on a central position of the substrate transport path between the light source and the gradient lens arrangement, and, on the other hand, on the sensor line.

11 Claims, 7 Drawing Sheets

(56) References Cited

U.S. PATENT DOCUMENTS

| | | | | |
|---|---|---|---|---|
| 5,252,991 | A | 10/1993 | Storlie et al. | |
| 6,151,117 | A | 11/2000 | Tuhro et al. | |
| 6,323,954 | B1 * | 11/2001 | Halter | 356/624 |
| 7,105,848 | B2 * | 9/2006 | Guha et al. | 250/559.45 |
| 7,145,163 | B2 * | 12/2006 | Ishii et al. | 250/559.36 |
| 7,973,300 | B2 * | 7/2011 | Takahashi et al. | 250/559.36 |
| 2007/0182951 | A1 * | 8/2007 | Wunderer et al. | 356/71 |

* cited by examiner

METHOD AND DEVICE FOR THE DETECTION OF A SUBSTRATE EDGE IN A PRINTING MACHINE

FIELD OF THE INVENTION

The present invention relates to a method and a device for the detection of a substrate edge in a printing machine comprising a substrate transport unit that defines a substrate transport path.

BACKGROUND OF THE INVENTION

In printing technology it is known to print, on the one hand, web-shaped substrates and, on the other hand, individual, sheet-shaped substrates. When printing a web-shaped substrate, the substrate is rolled off a roll and moved past one or more printing units of a printing machine, where a printing medium such as, for example, ink is applied to the web-shaped substrate.

In order to be able to ensure a uniform printed image, a substrate should always be moved through the printing machine in a known position, if possible. In particular in duplex-printing, when the substrate is turned over and repositioned, it should be ensured that the position of the substrate is known when printing the recto side, as well as when printing the verso side.

In order to be able to position the substrate, it is initially necessary to define the position of the substrate within the printing machine.

This may be accomplished, for example, by optical systems that parallelize the light of a light source in a collimator and, as a result of this, create a shadow image of a substrate edge on a sensor. FIG. 10 shows a schematic side view of such a known device 130. The device 130 comprises a light source 135, a collimator 140, as well as a CCD sensor line 145. The sensor line 145 is arranged in such a manner that plane-parallel light from the collimator 140 can impinge on the sensor line 145. A substrate 150 located between the collimator 140 and the sensor line 145 can partially cover the CCD sensor line 145. The degree of coverage can be used to determine the position of an edge of the substrate 150.

The disadvantage of such an arrangement is the limited length of the sensor units. A large detection range needs to be available in order to be able to detect substrates of greatly varying formats. However, this represents a problem from the viewpoint of the constructional size of the sensors because, as the length of the sensors increases, the constructional size of the collimator also increases significantly and, consequently, the sensor unit as a whole does not only become longer but also significantly more bulky.

SUMMARY OF THE INVENTION

Therefore, an object of the present invention is to provide a method and a device for the detection of a substrate edge in a printing machine, whereby a compact design can be ensured even with increasing sensor length.

In particular described is a method for the detection of a substrate edge in a printing machine comprising a substrate transport unit that defines a substrate transport path. During a first step, a light value is determined by collecting measured data of a first section of a sensor line, the section not being covered by the substrate, with the sensor line comprising a plurality of discrete pixels. Furthermore, the method comprises the step of determining a dark value of a second section of the sensor line that is covered by the substrate. During another step of the method, a threshold value is calculated based on the light and dark values of the sensor line. Subsequently, the measured data of the sensor line are collected, this indicating, when the threshold value on a pixel is exceeded, that the sensor line is not covered by the substrate. When the threshold value is not reached on a pixel, this indicates that the sensor line is covered by the substrate. Subsequently, the method shows the calculation of the position of the substrate edge based on the collected measured data. Such a method has the advantage of being highly accurate for the detection of the position of a substrate over a wide detection range of the sensors. This makes it possible to detect a large range of different substrate formats by means of this sensor unit and to thus position said substrates.

In one embodiment of the invention, the threshold value is calculated in such a manner that the threshold value corresponds to the mean of the light and dark values. This results in that a high accuracy in determining the substrate edge position is ensured while the transmissivity of the substrate increases or decreases which leads to an increase or decrease of the dark value.

The measured data are collected in the first section of the sensor line, preferably first in an outer region transversely to a transport direction of the substrate. The collecting of the measured data in the second region of the sensor line occurs initially in an inner region of the sensor line transversely to the transport direction of the substrate. Collecting measured data in this manner has the advantage that, in the case of substrate formats of different widths, it can be ensured that measured data of the sensor line are detected of sections that are covered by the substrate, as well as of sections that are not covered by the substrate.

Preferably, the collected measured data of the first section are used to determine a maximum light value. As a result of the fact that, for example, each new substrate sheet is newly detected, the maximum light value is also determined each time; this has the advantage that changing lighting conditions in the course of the method do not influence the accuracy of the detection of the substrate edge.

In particular, the measured data of the first and the second sections can be used to determine correction data for the adaptation of all the pixels of the sensor line. Due to this adaptation of all the pixels, it is possible to correct manufacturing-specific deviations in the output signals of the individual pixels in a simple manner.

Preferably, the correction of the light values of all the pixels of the sensor line by means of the correction data may include the adjustment of all the pixels to the maximum light value. Furthermore, the correction of the dark values of all the pixels of the sensor line by means of the correction data may include a compensation of an offset of a compensation signal of the sensor line. The adjustment of the pixels to the maximum light and dark values has the advantage that all the output signals of the pixels of one sensor line display the same minimum and maximum values, and that thus a uniform output level can be output.

Furthermore, in calculating the position of the substrate edge, the distances between the pixels can be taken into consideration. One advantage of this is that, with known distances and pixel sizes, it is possible to determine the actual position of the substrate edge based on the output signals.

In particular, an image of the substrate edge can be projected via a gradient lens arrangement on a scale of 1:1 onto the sensor line. The use of a gradient lens arrangement has the advantage that the arrangement can be easily adapted to any lengths of the sensor lines. In particular, in this instance, imaging of the substrate edge may be upright and true to side.

As a result of this, it can be ensured that, when two oppositely located substrate edges are detected, a light/dark transition occurs on the first sensor line and a subsequent dark/light transition occurs on the second sensor line.

In particular, the steps are performed during a transport of the substrate past the sensor line. This has the advantage that the method for determining the substrate edge does not interrupt the printing process.

The object to be achieved by the invention is also achieved by a device for the detection of a substrate edge in a printing machine comprising a substrate transport unit that defines a substrate transport path. This device comprises at least one light source arrangement for the generation of diffuse light. Furthermore, the device comprises a sensor line for the detection of light from the light source arrangement. Furthermore, the device comprises at least one gradient lens arrangement that is arranged between the light source and the sensor line in such a manner that, on the one hand, a focus is located on the center of the substrate transport path between the light source and the gradient lens arrangement and, on the other hand, on the sensor line. Due to such an arrangement, it is possible to produce a compact device with which a large range of different substrate formats can be detected.

In one embodiment of the invention, at least one light source arrangement, one sensor line and one gradient lens arrangement are located on opposite sides of the substrate transport path, transversely to a transport direction. As a result of this, two oppositely positioned substrate edges can be detected at the same time, thus leading to an improvement of positional accuracy.

In particular, the light source arrangement, the sensor lines and the gradient lens arrangement may be arranged in such a manner that they at least partially overlap the transport path. As a result of this, it is possible to prevent a substrate from completely covering the device.

In particular, the light source may comprise a diffusor that can ensure a uniform brightness distribution along the substrate edge.

In particular, the gradient lens arrangement may be configured in such a manner that the arrangement generates an image of the substrate edge on a scale of 1:1 on the sensor line.

Furthermore, the at least one sensor line may be a C-MOS sensor line. This represents a cost-effective solution for the detection of the different brightness values.

In particular, the light source arrangement may be an LED array. Generally, LED light sources display a long useful life and are thus low-maintenance.

Preferably, the substrate transport unit may comprise substrate guides. As a result of this, it can be ensured that the substrate can be securely guided past the sensor line, which can lead to an increase of accuracy of the substrate edge position data.

In particular, the at least one sensor line may comprise a plurality of elements that, in turn, comprise a plurality of pixels. Such a modular design of the sensor line makes it possible to implement different sensor lengths in a simple manner. In one embodiment of the invention, means for the determination of a light value are provided. The means collect measured data of a first section of a sensor line that is not covered by the substrate, the sensor line comprising a plurality of discrete pixels. In addition, the device comprises means for the determination of a dark value of a second section of the sensor line. The means collect measured data of a second section that is not covered by the substrate. Furthermore, means for calculating a threshold value based on the light and dark values of the sensor line are provided. Furthermore, the device comprises means for the collection of measured data of the sensor line, this indicating, when the threshold value on one pixel is exceeded, that the sensor line is not covered by the substrate. However, when the threshold value on a pixel is not reached, this indicates that the sensor line is covered by the substrate. Furthermore, the device comprises means for calculating the position of the substrate edge based on the collected measured data. In one embodiment, means for the determination of light and dark correction values from collected measured data are provided for the adaptation of all the pixels of the sensor line. This has the advantage that fluctuations of the output signals of the different pixels can be compensated and that thus a uniform output signal for the different pixels can be ensured.

Preferably, means for taking into consideration the distances of the pixels and the distances of the elements within the sensor line are provided for the calculation of the position of the substrate edge. By taking into consideration the distances of the pixels and distances of the elements, it is possible to directly draw a conclusion regarding the position of the substrate edge based on the output signals of the respective pixels.

BRIEF DESCRIPTION OF THE DRAWINGS

Hereinafter, the invention will be explained in detail with reference to the drawings. They show in FIG. 1 a schematic side view of a device for the detection of a substrate edge in accordance with the invention.

DETAILED DESCRIPTION OF THE INVENTION

Figure 1:
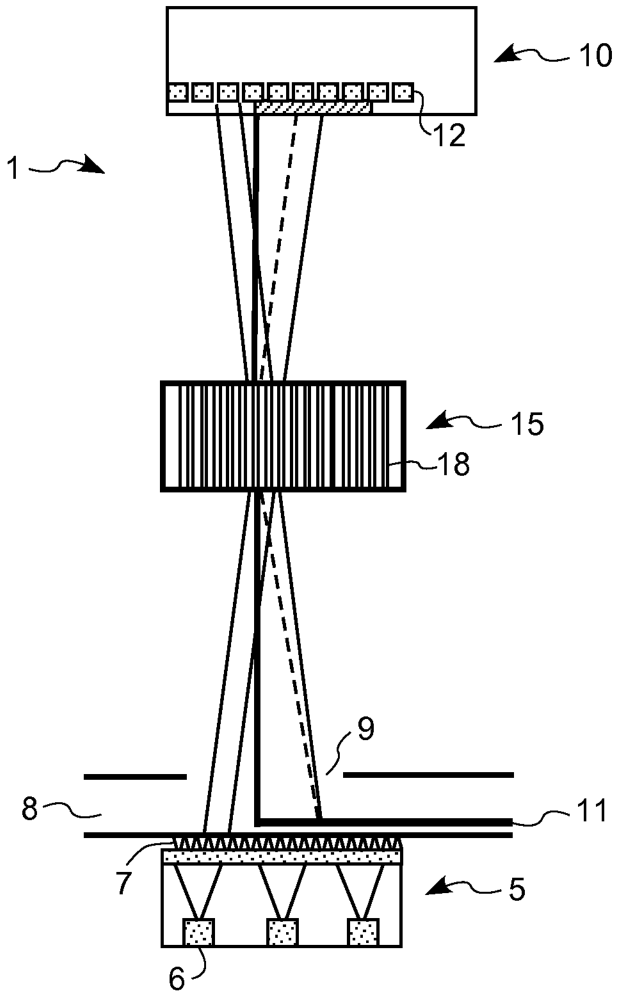

Indications regarding location or direction used in the description hereinafter relate primarily to the illustrations in the drawings and should not be viewed as being restrictive; however, they may also relate to a preferred final arrangement.

FIG. 1 shows a schematic side view of a device 1 for the detection of a substrate edge.

The device 1 for the detection of the substrate edge comprises a light source arrangement 5, a sensor line 10, as well as an interposed gradient lens arrangement 15. The gradient lens arrangement 15 is arranged between the light source arrangement 5 and the sensor line 10 in a manner so as to conduct light from the light source arrangement 5 to the sensor line 10. A substrate transport path 8 is formed between the gradient lens arrangement 15 and the light source arrangement 5, the substrate transport path being defined by suitable upper and lower guide elements and being disposed for guiding a substrate 11 such as, for example, a print sheet.

The light source arrangement 5 comprises a plurality of light sources 6, three of the light sources being schematically shown in FIG. 1. A diffusor 7 is shown above the light sources 6, the diffusor ensuring a homogeneous brightness distribution. The diffusor 7 may be an integral component of the substrate transport path 8. This may be achieved, for example, in that a recess is provided in one guide element of the substrate transport path 8, the recess accommodating the diffusor 7.

In the region above the light source arrangement 5, the substrate transport path 8 is interrupted by an opening 9 so as to allow light from the light source arrangement 5 to impinge on the gradient lens arrangement 15. A substrate 11 in the substrate transport path 8 can at least partially block the light on its path from the light source arrangement 5 to the gradient lens arrangement 15 and is then illuminated from the bottom by the light source arrangement 5. An image of such a partial coverage of the light source arrangement 5 through the substrate 11 is projected, 1:1 and in the same orientation, through the gradient lens arrangement 15 onto the sensor line 10, as is schematically shown in FIG. 1.

Figure 6:
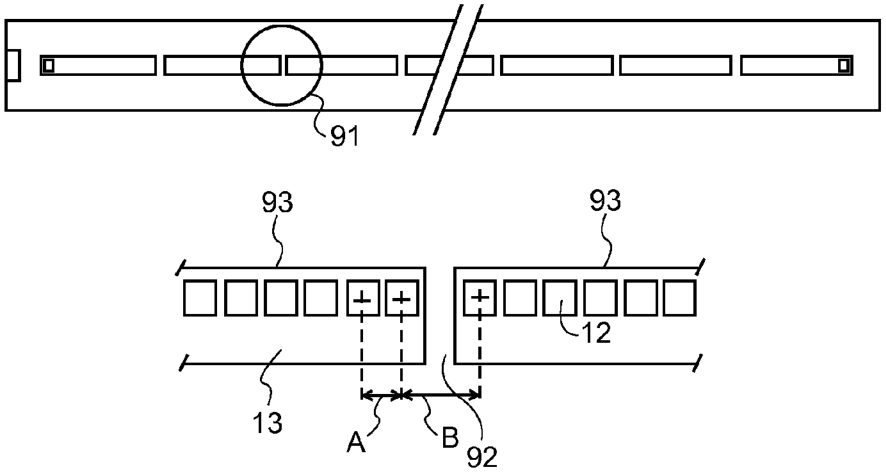
FIG. 6 a schematic view of a detail of a sensor line.

The sensor line 10 consists of a plurality of pixels 12 located next to each other, as can best be seen in FIG. 6. These pixels 12 are arranged in a manner such that the light exiting from the gradient lens arrangement 15 can impinge on the pixels 12. As is obvious from FIG. 6, the pixels 12 are combined to form elements 13. Within the respective elements 13, the pixels are arranged at a uniform and known distance A relative to each other, the distance A being measured between their respective centers. Adjacent pixels 12 of adjacent elements 13 are each at a known distance B from each other, the distance B being again the distance measured between the respective centers of the pixels. The distance B is substantially greater than the distance A, this resulting from the distance of the elements 13 from each other.

Figure 3:
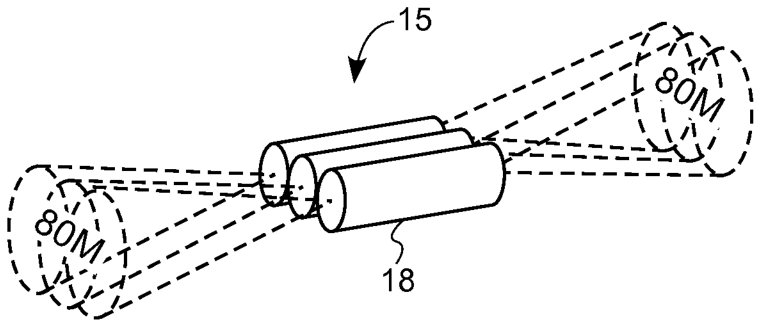
FIG. 3 a schematic perspective illustration of a gradient lens arrangement, wherein the true-to-side, upright illustration is shown schematically.
Figure 4:
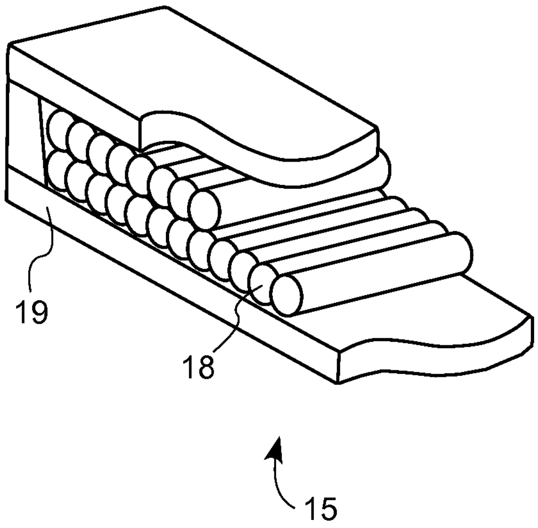
FIG. 4 a schematic perspective illustration of an alternative gradient lens arrangement with housing.

The gradient lens arrangement 15 consists of a plurality of individual rod-shaped gradient lens segments 18, as can best be seen in FIG. 4. The gradient lens segments 18 are accommodated in parallel arrangement relative to each other in a housing 19, the housing maintaining the alignment of the individual gradient lens segments 18 relative to each other, even in case of vibrations. However, the gradient lens arrangement 15 may also be configured differently than in FIG. 4. FIG. 3 shows, schematically, the reproduction of an image through a gradient lens arrangement 15 comprising individual gradient lens segments 18. As is obvious, the image is reproduced 1:1 and retaining the same orientation.

Figure 2:
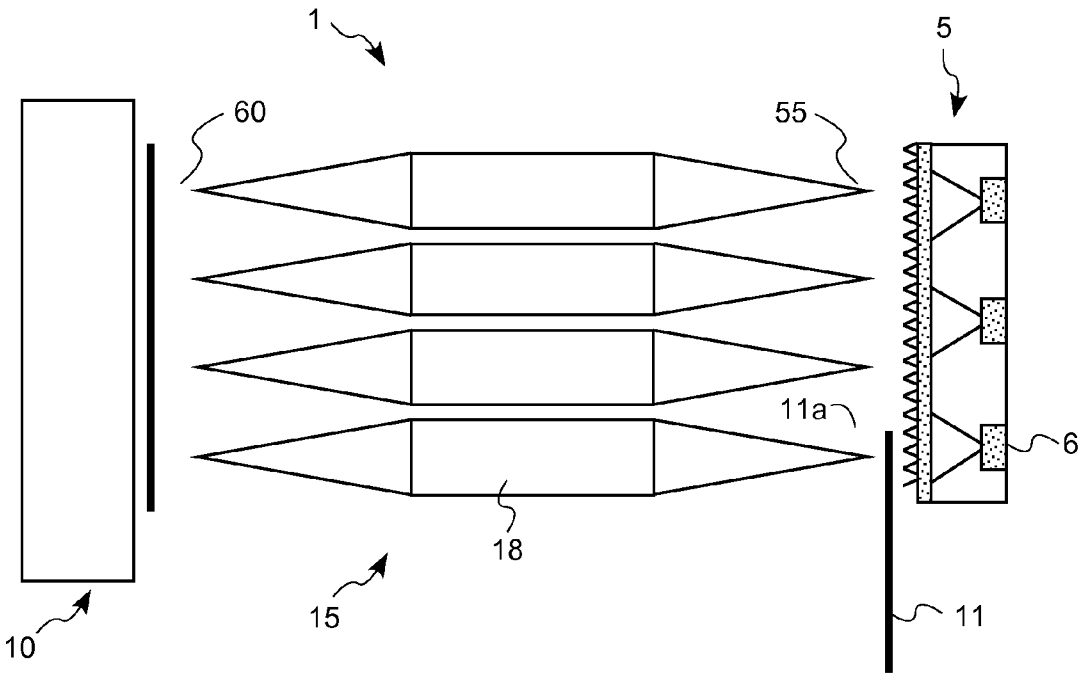
FIG. 2 a schematic side view of an alternative device for the detection of a substrate edge in accordance with the invention.

FIG. 2 shows a schematic side view of an alternative device 1 for the detection of a substrate edge. The same reference numerals as in FIG. 1 are used in FIG. 2, provided the same or similar elements are being described.

The device 1 for the detection of a substrate edge in accordance with FIG. 2 has essentially the same design as the device 1 for the detection of a substrate edge in accordance with FIG. 1, comprising a light source arrangement 5, a sensor line 10 as well as an interposed gradient lens arrangement 15. FIG. 2 does not show any special guide elements for the formation of a substrate transport path, however, appropriate elements that form such a path may be provided. As a rule, the substrate is moved along the middle of a substrate transport path. The substrate 11 shown in FIG. 2 is shown in such a central position during the movement along the transport path, the movement in FIG. 2 progressing perpendicularly to the sheet plane. In this case, the central position is defined as the position of the substrate that is located in the center between the guide elements of the substrate transport path, thus corresponding to the typical transport plane of a substrate. The gradient lens arrangement 15 is focused on this central position. As can be seen, the substrate partially extends into the region between the light source arrangement 5 and the gradient lens arrangement 15, with an edge 11*a* of the substrate 11 extending the farthest into this region.

The gradient lens arrangement 15 has a first focus 55 located on the central position of the substrate transport path 8 and a second, opposing, focus 60 located on the sensor line 10. As a result of this, a sharp image of a region of a substrate located between the light source arrangement 5 and the gradient lens arrangement 15 and, in particular, of a substrate edge can be generated on the sensor line. If the substrate deviates from the center of the substrate transport path, minimal blurriness occurs depending on the size of the deviation, this, however, being negligible, as a rule.

Figure 5:
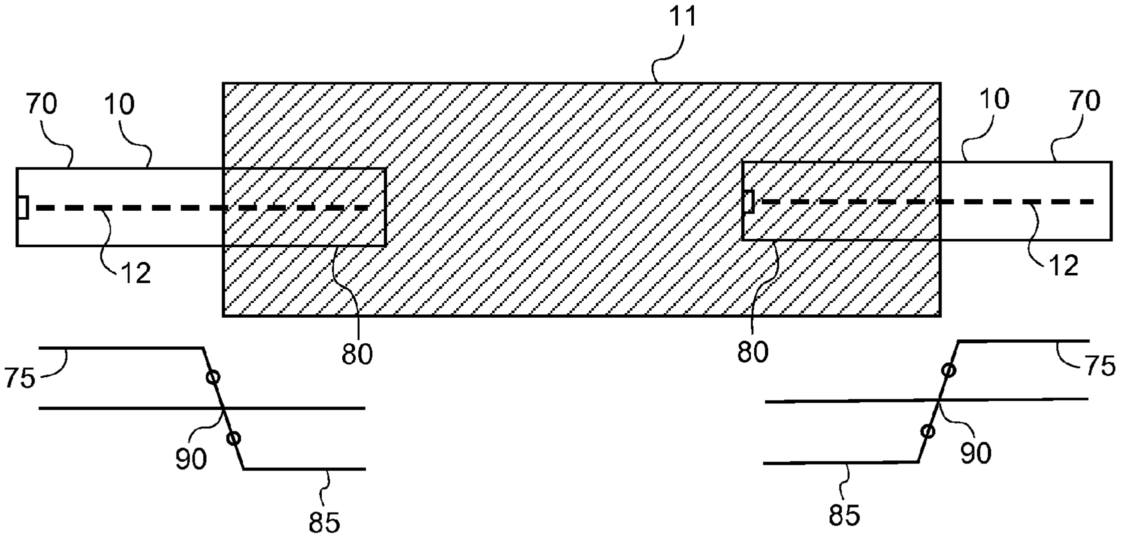
FIG. 5 a schematic plan view of the sensor lines of the device for the detection of a substrate edge as in FIG. 2, and a substrate which partially overlaps the sensor lines, as well as a schematic dark/light characteristic of the sensor lines.

A device 1 for the detection of a substrate edge as described above is arranged in a region, in which the edge 11*a* of a substrate 11 that is being moved along the substrate transport path 8 is to be expected. As can be seen in FIG. 5, respectively a device 1 for the detection of a substrate edge is provided on opposite ends of the substrate transport path 8 in a direction trans-verse to a transport direction of the substrate 11 in order to improve the detection of a position and to enable a central alignment of a substrate 11. However, in some cases, a single device 1 for the detection of a substrate edge could also be sufficient if strictly a lateral alignment is desired.

The detection of substrates 11 having different transmissivities is possible in the device 1 for the detection of a substrate edge. In order to reliably ensure this a light/dark value calibration is provided, wherein, as will still be explained hereinafter, the mean value between the dark and light values is adjusted as the switching threshold for the individual pixels 12 of a sensor line. For this, a light value 75 is determined based on measured values of pixels of the sensor line, the pixels having a clear view of the light source arrangement 5, i.e., no substrate is present between the light source arrangement 5 and the gradient lens arrangement 15. However, a dark value 85 is determined based on measured values of pixels of the sensor line whose view of the light source arrangement 5 is being blocked by a substrate, i.e., a substrate 11 is present between the light source arrangement 5 and the gradient lens arrangement 15.

Figure 9:
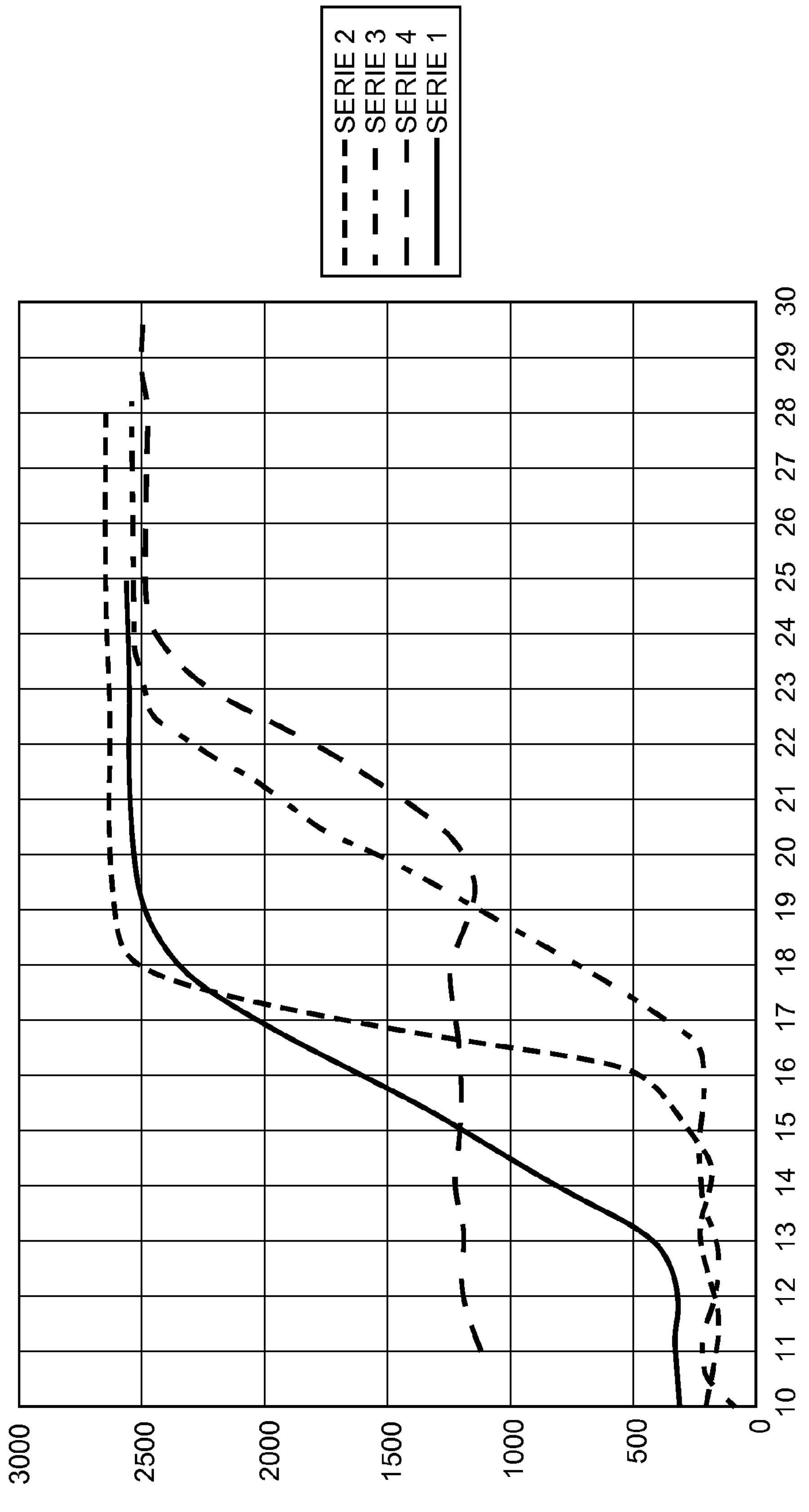
FIG. 9 a diagram with dark/light characteristics of a sensor line, the characteristics having been generated with various substrates exhibiting different transmissivities.
Figure 10:
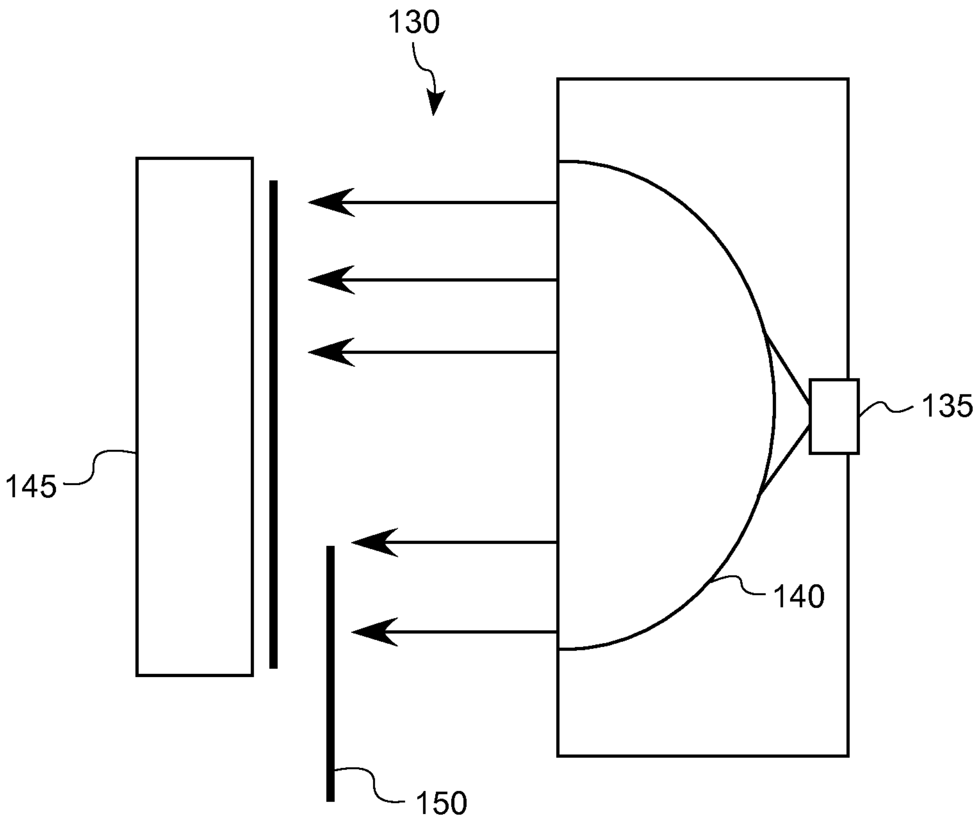
FIG. 10 a schematic side view of a known device for the detection of a substrate edge.

Depending on the substrates that are being used, considerable deviations of the dark value may occur. FIG. 9 shows the dark/light values for measurements on different series of substrates. The x-axis shows individual pixel positions along a sensor line 10, and the y-axis shows the measured values for relative brightness values on the individual pixel positions. In each case, the measurements show the situation with a substrate in the region of the substrate transport path 8, i.e., a few pixels are covered whereas others have a clear view of the light source arrangement 5. The dark values 85 are a function of the transmissivity of the substrate and are higher for thinner or more translucent substrates than for more opaque substrates.

In FIG. 9, series 1 through 3 each show measurements on essentially opaque substrates with minimally different weights. Series 4 shows a measurement on a semi-transparent substrate. The different transitions between dark and light values may be attributable to substrate properties, in particular, the cutting edge of the substrate 11, on the one hand, and also to the position of the substrate relative to the focus of the gradient lens arrangement 15, on the other hand, as well as to other factors.

The differences among the light values 75 of the different substrates may be attributable to changes in ambient lighting or to a temperature drift of the sensors.

Considering the progression in the region of the dark values 85 in FIG. 9, a slight oscillation can be noticed. This oscillation may have its origin in the structure of the substrate because there is no homogeneous density distribution in the substrate. If, for example, the light of the light source arrangement 5 impinges on a substrate fiber, the transmissivity at this point is reduced and, consequently, the dark value 85 is also lower.

Hereinafter follows a more detailed explanation of a method for detecting a substrate edge in a printing machine comprising a substrate transport unit that defines a substrate transport path 8, with reference being made to the figures and, in particular, to FIGS. 5 through 9.

Usually, a substrate 11 is moved in the center of the substrate transport path 8 past the device 1 for the detection of a substrate edge in such a manner that the substrate 11 extends at least partially into the region between the sensor line 10 and the gradient lens arrangement 15. An image generated by the gradient lens arrangement 15 on the sensor line 10 thus overlaps a partial region of the sensor line 10, darkening the partial region. A first section 70 of the sensor line 10 thus has a clear view of the light source arrangement 5, whereas a section 80 of the sensor line 10 is darkened by the substrate 11.

Now, a light value 75 is determined over at least a partial region of the first sections 70, in that measured data of a plurality of discrete pixels 12 are taken and their mean is determined. Accordingly, a dark value 85 is determined over at least a partial region of the second section 80, in that measured data of a plurality of discrete pixels 12 are taken and their mean is determined. Preferably, the only pixels used for the determination of the light and dark values are those that are certainly not covered or those that are fully covered. Now, a threshold value 90 is calculated based on the light and dark values 75, 85. In the preferred embodiment, the threshold value is determined as the mean value of light and dark values.

Subsequently, the position of the edges 11*a* of the substrate 11 inside the substrate transport path 8 is determined. First, the measured data of the individual pixels 12 are interpolated, and it is determined where the threshold value is exceeded or not reached. Based on the position of the transition and the position of the adjacent pixels, it is possible to determine the position of the substrate edge 11*a*. For this, the distances A (within an element 13) or B (transition of elements 13) between the pixels 12 must be taken into consideration.

Figure 7:
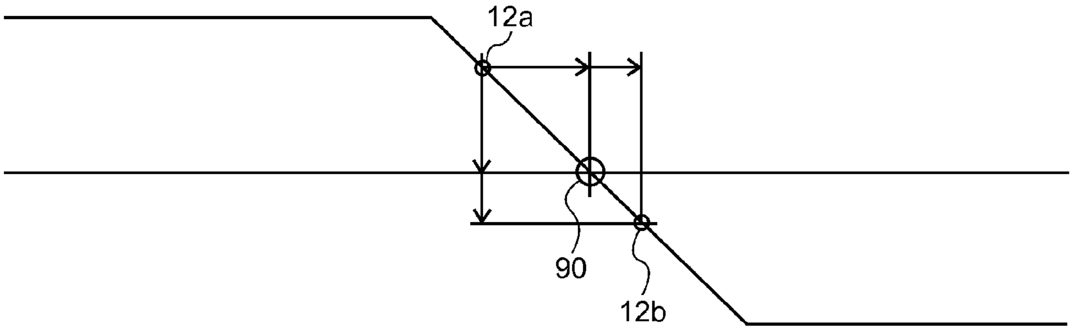
FIG. 7 a schematic light/dark characteristic of a sensor line.
Figure 8:
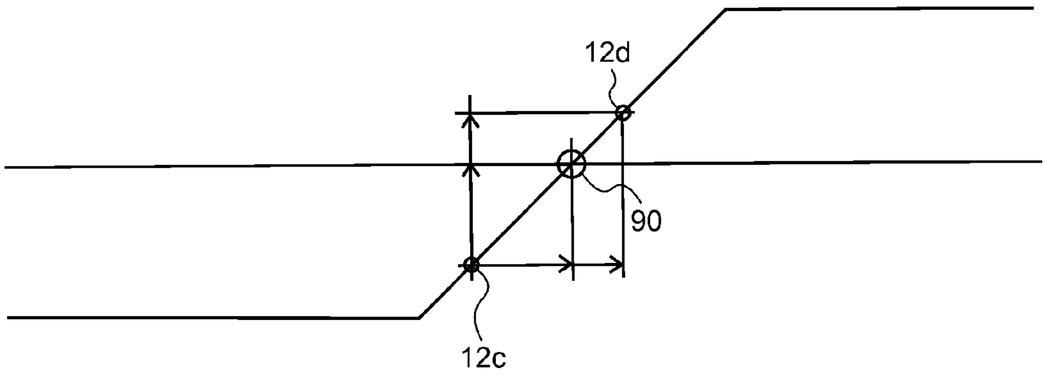
FIG. 8 a schematic dark/light characteristic of a sensor line.

This is illustrated in FIGS. 7 and 8, where a light/dark transition is shown between pixels 12*a* and 12*b* and a dark/light transition is shown between pixels 12*c* and 12*d*.

Alternatively, a comparison of all the measured values with the threshold value is also possible. Subsequently, the pixels 12 between which a light/dark transition occurs are determined. The position of the edge is then determined based on the thusly determined pixel positions.

The invention has been described with reference to specific embodiments without, however, being restricted to the specifically illustrated form. In particular, it is possible to combine the features of one embodiment with the features of another embodiment, or to exchange specific features with each other, provided there is compatibility.

The invention claimed is:

1. A method for detecting a substrate edge in a printing machine comprising a substrate transport unit that defines a substrate transport path, said method comprising:

determining a light value by collecting measured data of a first section of a sensor line, said first section not being covered by the substrate and said sensor line having a plurality of discrete pixels;

determining a dark value by collecting measured data of a second section of the sensor line, said sensor line being covered by the substrate;

calculating a threshold value based on the light and dark values of the sensor line;

collecting measured data of the sensor line, wherein, when the threshold value on a pixel is exceeded, determining that said pixel is not covered by the substrate, and when the threshold value on a pixel is not reached, determining that said pixel is covered by the substrate; and calculating a position of the substrate edge based on the collected measured data, wherein based on the measured data of the first and the second sections, correction data are determined for the adaptation of all the pixels of the sensor line, and wherein a correction of the dark values of all the pixels of the sensor line by means of the correction data includes a compensation of an offset of an output signal of the sensor line.

2. The method of claim 1, wherein the threshold value is calculated in such a manner that said threshold value corresponds to the mean value of the light and dark values.

3. The method of claim 1, wherein the step of collecting the measured data in the first section of the sensor line comprises an outer region, relative to a transport direction of the substrate, of the sensor line, and that the step of collecting the measured data in the second section of the sensor line comprises an inner region of the sensor line.

4. The method of claim 3, wherein a maximum light value is determined based on the measured data of the first section.

5. The method of claim 1, wherein a correction of the light values of all the pixels of the sensor line by means of the correction data includes an adjustment of all the pixels to the maximum light value.

6. The method of claim 1, wherein the calculating of the position of the substrate edge, takes into consideration distances between the pixels.

7. The method of claim 6, wherein imaging of the substrate edge is upright and true to side.

8. The method of claim 1, wherein an image of the substrate edge is projected via a gradient lens arrangement on a scale of 1:1 onto the sensor line.

9. The method of claim 1, wherein said steps are performed during a transport of the substrate past the sensor line.

10. A device for the detection of a substrate edge in a printing machine comprising:

means for determining a light value by collecting measured data of a first section of a sensor line that is not covered by the substrate;

means for determining a dark value of a second section of the sensor line that is covered by the substrate;

means for calculating a threshold value based on the light and dark values of the sensor line;

means for collecting measured data of the sensor line, this indicating, when the threshold value on a pixel is exceeded, that the pixel is not covered by the substrate, and indicating, when the threshold value on a pixel is not reached, that the pixel is covered by the substrate; and means for calculating the position of the substrate edge based on the collected measured data and means for determining light and dark value correction data from the collected measured data for adapting all the pixels of the sensor line, wherein a correction of the dark values of all pixels of the sensor line by the correction data includes a compensation of an offset of an output signal of the sensor line.

11. The device of claim 10, comprising a means for taking into consideration distances of the pixels and distances of the elements within the sensor line for calculating the position of the substrate edge.

* * * * *